United States Patent [19]

Hirshman et al.

[11] 4,136,046

[45] Jan. 23, 1979

[54] STORAGE-STABLE PRECURSORS FOR RIGID POLYURETHANE FOAMS

[75] Inventors: Justin L. Hirshman, East Brunswick; Kenneth Treadwell, Rahway, both of N.J.

[73] Assignee: M&T Chemicals Inc., Stamford, Conn.

[21] Appl. No.: 688,157

[22] Filed: May 20, 1976

[51] Int. Cl.² .......................... C08K 5/57; C08K 5/17
[52] U.S. Cl. .................................. 252/182; 260/429.7; 521/121; 521/115; 521/112; 521/175
[58] Field of Search ................... 252/182; 260/2.5 AB, 260/2.5 AC, 2.5 AM, 75 NB, 77.5 AB, 429.7

[56] References Cited

U.S. PATENT DOCUMENTS

| | | | |
|---|---|---|---|
| 3,194,773 | 7/1965 | Hostettler | 260/2.5 AB |
| 3,392,153 | 7/1968 | Hostettler et al. | 260/2.5 AB |
| 3,620,985 | 11/1971 | Larkin et al. | 260/2.5 AB |
| 3,822,223 | 7/1974 | Gemeinhardt et al. | 260/2.5 AC |
| 3,876,567 | 4/1975 | Larkin et al. | 260/2.5 AC |

*Primary Examiner*—Benjamin R. Padgett
*Assistant Examiner*—Irwin Gluck
*Attorney, Agent, or Firm*—Kenneth G. Wheeless; Robert Spector

[57] ABSTRACT

Diorganotin compounds wherein at least one of the remaining valences on the tin atom is satisfied by a sulfur atom or a thiocyanate group are unique among diorganotin compounds in that they retain their catalytic activity over extended periods of time in the presence of the precursors or masterbatches conventionally employed to prepare rigid, cellular polyurethanes.

11 Claims, No Drawings

STORAGE-STABLE PRECURSORS FOR RIGID POLYURETHANE FOAMS

BACKGROUND

This invention relates to the preparation of rigid cellular polyurethanes. This invention further relates to catalyst-containing precursors for these polyurethanes which can be stored for considerable periods of time without any significant decrease in reactivity.

Rigid polyurethane foams are widely used as insulating materials in the construction industry. The light weight and low heat conductivity of these foams make them desirable for use as insulation in refrigerators and containers for hot or cold liquids.

Rigid polyurethane foams can be prepared using a variety of well known methods. In some instances it is desirable to prepare the foam at the location where it will be employed, such as between the inner and outer walls of a building or container. For this type of application it is most preferred to employ a two-component system, one of which is a polyfunctional isocyanate such as polymethylene polyphenyl isocyanate. The second component contains the polyol, gel catalyst and blowing agent together with any modifiers or additives. A surfactant such as a siloxane polymer is usually included to ensure a uniform cell structure in the final foam. The second component is usually employed as a pre-packaged mixture that is prepared weeks or even months before it is reacted with the isocyanate.

It is well known that both divalent and tetravalent tin compounds are effective gel or polymerization catalysts for cellular polyurethanes. Three of the most preferred catalysts are stannous 2-ethyl hexoate, dibutyltin di(lauryl mercaptide) and dibutyltin dilaurate. Unfortunately these catalysts, in addition to most of the other classes of tin compounds, undergo a substantial loss of activity when incorporated into a precursor or "masterbatch" that is subsequently stored for any considerable length of time before being reacted with the isocyanate component. The masterbatch contains one or more of the reactants, catalysts and modifiers which are subsequently combined with the isocyanate component to form the foam product. These tin-containing catalysts are therefore not suitable for use in any of the aforementioned pre-packaged two-component systems for preparing rigid cellular polyurethanes.

It is therefore an objective of this invention to define a class of diorganotin compounds which do not lose catalytic activity in the presence of conventional precursors for rigid polyurethane foams. A second objective is to prepare storage-stable precursors for rigid cellular polyurethanes.

SUMMARY OF THE INVENTION

This invention provides a storage-stable catalyst-containing precursor for rigid cellular polyurethanes. The precursor comprises a polyol containing at least 2 active hydrogen atoms, as determined by the Zerwitinoff method, and an organotin gel catalyst. The gel catalyst exhibits a formula selected from the group consisting of $R_2Sn(SCN)_2$, $[R_2Sn(SCN)]_2O$, $[R_2Sn(SCN)]_2S$, $(R_2SnX)_2S$ and $R_2SnS$. R is a hydrocarbon and X is chlorine, bromine or iodine.

Optionally, the precursor contains a blowing agent, a silicone-based surfactant and a catalytically effective amount of a tertiary amine.

DETAILED DESCRIPTION OF THE INVENTION

The present organotin gel catalysts contain two hydrocarbon radicals bonded to one or two tin atoms. At least one of the remaining two valences on the tin atom or atoms are satisfied by a sulfur atom or a chain of 2 or 3 sulfur atoms. Any remaining valences are satisfied by oxygen or a halogen. The sulfur atom or atoms can be bonded to tin or another sulfur atom. Alternatively, a sulfur atom can be part of a thiocyanate (—SCN) group. The hydrocarbon group represented by R in the foregoing formulae can be alkyl containing from 1 to 12 carbon atoms, cycloalkyl, phenyl, aralkyl or alkaryl. The alkyl portions of the aralkyl and alkaryl groups contain from 1 to 12 carbon atoms and the aryl portion is preferably phenyl. Since the most readily available organotin compounds are those wherein R of the preceding formulae is methyl, butyl, octyl or phenyl, these compounds would be preferred for use in the precursors of this invention. It should be understood that the preference is one of convenience, and is not based on any differences in retention of catalytic activity among the individual organotin compounds encompassed by the preceding formulae.

All of the present classes of diorganotin catalysts are disclosed in the chemical literature. Bis(dibutylthiocyanato tin) oxide and bis(dibutylthiocyanato tin) sulfide, together with methods for preparing these compounds, are disclosed in Japanese Pat. Nos. 8366/67 and 8015/67, respectively. The oligomeric diorganotin polysulfides can be prepared by reacting the corresponding diorganotin dihalide with a stoichiometric amount of an alkali metal polysulfide.

The preferred catalysts are diorganotin sulfides and diorganotin dithiocyanates.

The present gel catalysts are suitable for use with substantially all of the known polyalkylene polyols and polyfunctional isocyanates conventionally employed to prepare rigid polyurethane foams. Suitable polyalkylene polyols are liquids which typically exhibit an average molecular weight of between about 500 and 5000 and include hydroxyl-containing polyethers, polyesters and polyamides, alkylene glycols, polymercaptans and polyamines. These polyalkylene polyols exhibit either primary or secondary active hydroxyl groups. The class of hydroxyl-containing polyethers or polyesters includes fatty acid glycerides having hydroxyl numbers between 50 and 75, such as castor oil, hydrogenated castor oil and "blown" natural oils.

Hydroxyl-terminated polyethers, a preferred type of polyalkylene polyol, include polyalkylene glycols, e.g. polyethylene glycols and polypropylene glycols. The molecular weight of these compounds is preferably between about 200 and 5000.

A type of polyether that is particularly preferred for rigid polyurethane foams is obtained by polymerizing propylene oxide in the presence of sucrose or other compound containing at least three hydroxyl groups. The resultant product exhibits the polyfunctionality required to achieve the crosslinking characteristic of rigid polyurethane foams.

Hydroxyl-terminated polyesters, a second type of polyalkylene polyol, can be obtained by the esterification-condensation reaction of aliphatic dibasic carboxylic acids with glycols, triols or mixtures thereof, in proportions such that most of all of the resultant polymer chains contain terminal hydroxyl groups. Dibasic carboxylic acids suitable for preparing polyesters include aliphatic and aromatic acids such as adipic, fumaric, sebacic and the isomeric phthalic acids. The acid is reacted with a polyhydroxylated compound such as ethylene glycol, diethylene glycol or trimethylol propane, among others.

The polyfunctional isocyanates used to prepare rigid polyurethane foams include both polyisocyanates and polyisothiocyanates. While the invention is described with specific references to the reaction of certain polyfunctional isocyanates, it is generically applicable to the reaction of any compound containing more than two —N═C═G radicals wherein G is oxygen or sulfur. Compounds within this generic definition include polyisocyanates and polyisothiocyanates of the formula $R(NCG)_x$ in which the average value of x is greater than 2, preferably from 2.1 to 3.0. R can be alkylene, substituted alkylene, arylene, substituted arylene or other polyvalent hydrocarbon radical that may optionally contain one or more aryl-NCG bonds and one or more alkyl-NCG bonds.

Suitable isocyanates include the polyfunctional by-products obtained during the preparation of the isomeric tolylene diisocyanates. Polymethylene polyphenyl isocyanate is an example of such a by-product. Triisocyanates obtained by reacting 3 moles of an arylene diisocyanate for each mole of a triol, e.g. the products formed from 3 moles of tolylene diisocyanate and 1 mole of hexane triol are also suitable.

Oligomeric and polymeric isocyanates of the general formula $(RNCG)_x$ and $[R(NCG)_x]_y$ in which x and y are from 2.1 to 10, are also useful, as are the compounds of the general formula $M(NCG)_x$ wherein x is more than 2 and M is a difunctional or polyfunctional atom or group.

The amount of isocyanate used is usually in excess of the stoichiometric amount required to react with the active hydrogens supplied by the polyol and any water present, thereby forming urethane

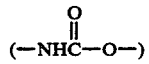

and urea

linkages in the polymer chains. Depending upon the desired density of the urethane foam and the amount of crosslinking desired, the ratio of isocyanate equivalents to the equivalents of active hydrogen should be 0.8 to 1.2, respectively, and preferably between 0.9 and 1.1.

The optimum concentration of the present organotin catalysts will be determined by a number of factors including reactivity of the polyol and isocyanate and the desired rise time. Conventionally this concentration is from 0.1 to 10 parts by weight per 100 parts of polyol, preferably from 0.1 to 5.0 part.

The present tin compounds can be advantageously employed in combination with those tertiary amines conventionally used as gel catalysts in rigid foam formulations. Suitable amines include dimethylcyclohexyl amine, N-ethyl morpholine and triethylene diamine. The concentration of amine is preferably from 1 to 4 parts by weight per 100 parts of polyol.

In addition to the polyol and one or more of the present catalysts the precursor often contains a surfactant and a blowing agent which boils or decomposes at the elevated temperatures produced during the polyol-isocyanate reaction to yield a gaseous product which forms bubbles that are entrapped within the reacting polyol-isocyanate mixture. Among the preferred blowing agents are those chlorine-containing hydrocarbons boiling from 35 to about 90° C. The surfactant is preferably a siloxane-alkylene oxide copolymer and is present in an amount of from 1 to about 5 parts by weight per 100 parts of polyol.

As previously disclosed, the present organotin catalysts are unique in that their activity is not affected to any significant extent when incorporated into a precursor or masterbatch containing the polyol and, optionally, one or more of the aforementioned ingredients, other than the isocyanate, required to prepare a rigid polyurethane foam.

A precursor containing all of the components other than the isocyanate is desirable for "in-situ" preparation of rigid foams at the location where the foam is to be installed. This is often at a construction site where there are no facilities for measuring and uniformly blending the various components of the precursor. Pre-measured amounts of the precursor and polyfunctional isocyanate are blended just prior to formation of the foam. Depending upon the particular end use, the resultant mixture is sprayed onto a surface or poured into a cavity and allowed to react, forming a rigid foam.

The accompanying examples demonstrate the long-term retention of reactivity that characterizes precursors containing the present organotin catalysts and compares these results with those obtained using other conventional organotin catalysts. The examples are representative of the various suitable precursors and catalysts, and should not be interpreted as limiting the scope of the invention set forth in the accompanying claims.

The time interval between combining of all reagents and the onset of polymerization, as indicated by a transformation of the reaction mixture from clear to opaque, is referred to as "cream time". The interval between combining of the precursor with the polyfunctional isocyanate and the completion of the ensuing foaming reaction is referred to as the "rise time". All parts and percentages are by weight unless otherwise specified.

EXAMPLE 1

A precursor or masterbatch for a rigid polyurethane foam was prepared by combining the following components in the indicated proportions. The polyol is a polyhydroxy-based propylene oxide-ethylene oxide copolymer exhibiting a hydroxyl number of 490 and available as LS-490 from the Union Carbide Chemical Corporation. The surfactant is a siloxane-oxyethylene-oxypropylene copolymer available as L-5340 from the Union Carbide Chemical Corporation.

| PRECURSOR | |
|---|---|
| Component | Parts By Weight |
| Polyol | 100 |
| Surfactant | 1.5 |
| Trichlorofluormethane | 30 |
| Dimethylcyclohexyl Amine | 1.0 |
| Diorganotin Compound | 1.0 |
| Water (if present) | 1.0 |

135 Parts of precursor was combined with 122 parts of polymethylene polyphenyl isocyanate exhibiting an isocyanate equivalent of about 133. The resultant mixture was then stirred rapidly for several seconds, poured into a suitable container and allowed to rise. The cream and rise times were noted. A portion of each precursor was placed in a closed container and stored for six months under ambient conditions of temperature and pressure. At the end of this period each precursor was reacted with the polyfunctional isocyanate as described hereinabove. The cream and rise times were noted and recorded in the accompanying Table 1 together with the values observed for the freshly prepared precursor.

TABLE 1

| Catalyst | Initial Reactivity Cream Time (seconds) | Initial Reactivity Rise Time (seconds) | Reactivity Following 6 Month Storage Period Cream Time (seconds) | Reactivity Following 6 Month Storage Period Rise Time (seconds) | % Loss in Reactivity (Rise Time) |
|---|---|---|---|---|---|
| Dibutyltin dithiocyanate + water (1 part) | 26 | 47 | 26 | 48 | 0 |
| Dibutyltin sulfide | 24 | 32 | 24 | 33 | 3 |
| Dibutyltin sulfide + water (1 part) | 20 | 36 | 23 | 35 | 0 |
| Controls (more than 20% loss in reactivity during six month storage period) | | | | | |
| Dibutyltin dilaurate | 22 | 34 | 31 | 47 | 38 |
| Bis(dibutyltin-S,S'-di IOMA) sulfide* + water (1 part) | 17 | 53 | 52 | 119** | 124 |
| Bis(dibutyl lauryl tin) oxide | 18 | 27 | 26 | 41 | 52 |
| Dibutyltin di-neo-decanoate | 18 | 27 | 23 | 45 | 67 |
| Dimethyltin-S,S'-bis IOMA* + water (1 part) | 13 | 59 | — | 203** | 244 |

*IOMA = isooctyl mercaptoacetate
**measured after four months of storage

The data in the table demonstrate the uniqueness of the present gel catalysts with regard to retention of activity in water-containing precursors for rigid polyurethane foams. The control precursors exhibited substantial reductions in reactivity in the presence of even trace amounts of water present in the precursor. It should be noted that of the control compounds, those containing tin-sulfur bonds were the most unstable.

EXAMPLE 2

The stability exhibited by a number of catalytically active organotin compounds was evaluated using an accelerated aging test conducted at a temperature of 71°±2° C. Comparative data demonstrate that a one week period at this temperature is equivalent to one month under the conditions specified in the preceding Example 1.

The test was conducted by adding polymethylene polyphenyl isocyanate to a portion of the formulation described in the foregoing Example 1. The relative amounts of polyfunctional isocyanate and precursor were 122 and 133.5 or 134.5 parts, respectively, depending upon whether or not water was present. Each of the formulations evaluated was placed in a sealed container and the container was, in turn, placed in an oven maintained at a temperature of 71°±2° C. Samples of each precursor were taken at weekly intervals during the five week period and reacted with the aforementioned isocyanate component. The cream and rise times of each precursor are recorded in the accompanying Table 2. To determine the effect of accelerated aging on an uncatalyzed precursor, a precursor containing all of the ingredients with the exception of the organotin compound was evaluated concurrently with the catalyzed formulations. In this instance one part of dibutyltin dilaurate was added prior to addition of the isocyanate component.

In Table 2 each of the catalysts evaluated is represented by a number as follows.
1—dibutyltin dilaurate (control)
2—dibutyltin dithiocyanate
3—bis[dibutyltin-S-(isooctyl mercaptoacetate)] sulfide
4—dibutyltin di-neo-decanoate (control)
Blank—catalyst added together with isocyanate

TABLE 2

| Catalyst No. | 1 | 2 | 3 | 4 | Blank |
|---|---|---|---|---|---|
| Cream Time (sec.) | 24 | 12 | 24 | 22 | 24 |
| Rise Time (sec.) | 36 | 22 | 34 | 33 | 36 |
| After 1 Week | | | | | |
| Cream | 32 | 10 | 70 | 29 | 22 |
| Rise | 49 | 15 | 89 | 33 | 35 |
| After 2 Weeks | | | | | |
| Cream | 35 | 12 | 78 | 30 | 26 |
| Rise | 61 | 17 | 99 | 46 | 42 |
| After 3 Weekks | | | | | |
| Cream | 65 | 13 | Discontinued | 36 | 25 |
| Rise | 100 | 20 | | 59 | 40 |
| After 4 Weeks | | | | | |
| Cream | Did Not Rise | 14 | | Discontinued | 26 |
| Rise | | 21 | | | 39 |
| After 5 Weeks | | | | | |
| Cream | | 13 | | | 1 |
| Rise | | 21 | | | |

1-Not determined due to lack of any change during preceding tests.

What is claimed is:
1. In an improved method for preserving catalytic activity during long term storage of precursors for rigid cellular polyurethanes wherein said precursor comprises a polyol containing at least two active hydrogen atoms, as determined by the Zerewitinoff method, and a catalytically effective amount of an organotin compound as the gel catalyst, the improvement which consists of storing said polyol in the presence of a gel catalyst selected from the group consisting of $R_2Sn(SCN)_2$, $[R_2Sn(SCN)]_2O$, $(R_2SnSCN)_2S$, $(R_2SnX)_2S$ and $R_2SnS$, wherein R is a monovalent hydrocarbon and X is chlorine, bromine or iodine.

2. A method according to claim 1 wherein the gel catalyst is a diorganotin sulfide or a diorganotin dithiocyanate.

3. A method according to claim 1 wherein R is selected from the group consisting of alkyl containing from 1 to 12 carbon atoms, cycloalkyl, phenyl, aralkyl and alkaryl, wherein the alkyl portion of said aralkyl and alkaryl groups contain from 1 to 12 carbon atoms.

4. A method according to claim 3 wherein R is phenyl.

5. A method according to claim 3 wherein R is methyl, butyl or octyl.

6. A method according to claim 5 wherein R is butyl.

7. A method according to claim 1 wherein the polyol is combined with at least one member of the group consisting of
(a) a silicon-containing surfactant in an amount from about 1 to 5 parts by weight per 100 parts of said polyol, and
(b) a blowing agent in an amount from about 10 to 50 parts by weight per 100 parts of said polyol, and
(c) a catalytically effective amount of a tertiary amine.

8. A method according to claim 7 wherein said tertiary amine is selected from the group consisting of dimethylcyclohexyl amine, N-ethyl morpholine and triethylene diamine.

9. A method according to claim 7 wherein said blowing agent is a chlorine-containing hydrocarbon and boils from 35 to about 80° C.

10. A method according to claim 1 wherein said polyol is a polymer of propylene oxide.

11. A method according to claim 1 wherein said gel catalyst is present at a concentration of from 0.1 to 10 parts by weight per 100 parts of polyol.